(12) United States Patent
Rinne (10) Patent No.: US 9,081,791 B2
(45) Date of Patent: Jul. 14, 2015

(54) METHOD AND APPARATUS FOR REDUCING DUPLICATES OF MULTIMEDIA DATA ITEMS IN SERVICE SYSTEM

(71) Applicant: P2S Media Group Oy, Helsinki (FI)

(72) Inventor: Timo Johannes Rinne, Helsinki (FI)

(73) Assignee: P2S MEDIA GROUP OY, Helsinki (FI)

( * ) Notice: Subject to any disclaimer, the term of this patent is extended or adjusted under 35 U.S.C. 154(b) by 0 days.

(21) Appl. No.: 14/386,187

(22) PCT Filed: Mar. 18, 2013

(86) PCT No.: PCT/FI2013/050305
§ 371 (c)(1),
(2) Date: Sep. 18, 2014

(87) PCT Pub. No.: WO2013/140037
PCT Pub. Date: Sep. 26, 2013

(65) Prior Publication Data
US 2015/0046408 A1    Feb. 12, 2015

(30) Foreign Application Priority Data

Mar. 19, 2012  (FI) ...................................... 20125296

(51) Int. Cl.
*G06F 17/30* (2006.01)
*H04N 21/231* (2011.01)
(Continued)

(52) U.S. Cl.
CPC ........ *G06F 17/30156* (2013.01); *G06F 17/301* (2013.01); *G06F 17/3002* (2013.01);
(Continued)

(58) Field of Classification Search
CPC ..................... G06F 17/3002; H04N 21/23113; H04N 21/23109; H04N 21/2743; H04N 21/4332; H04N 21/4335

USPC .......................................................... 707/692
See application file for complete search history.

(56) References Cited

U.S. PATENT DOCUMENTS 6,963,975 B1 * 11/2005 Weare ........................... 713/176
7,302,574 B2 * 11/2007 Conwell et al. ............... 713/176
(Continued)

FOREIGN PATENT DOCUMENTS

| WO | 2011018852 A1 | 2/2011 |
| WO | 2011087648 A1 | 7/2011 |
| WO | 2011155551 A1 | 12/2011 |

OTHER PUBLICATIONS

Yujuna Tan, et al., "SAM: A Semantic-Aware Multi-tiered De-duplication Framework for Cloud Backup", 2010 39th International Conference on Parallel Processing (ICPP), Sep. 13, 2010, DOI 10.1109/COO,2010.69, pp. 614-623.

(Continued)

*Primary Examiner* — Rehana Perveen
*Assistant Examiner* — Tiffany Thuy Bui
(74) *Attorney, Agent, or Firm* — Ziegler IP Law Group, LLC (57) ABSTRACT

A method of reducing duplicates of multimedia data items in a service system includes maintaining service system hash values for the multimedia data items of the service system; receiving a first multimedia data item; and hashing the received multimedia data item to provide a first hash value. The method further includes searching the first hash value from the service system hash values; and approving the received multimedia data item to the service system in response to the first hash value being not found when searching from the service system hash values.

20 Claims, 4 Drawing Sheets

(51) Int. Cl.
*H04N 21/2743* (2011.01)
*H04N 21/433* (2011.01)
*H04N 21/4335* (2011.01)

(52) U.S. Cl.
CPC .... *G06F17/30047* (2013.01); *G06F 17/30858* (2013.01); *G06F 17/30867* (2013.01); *H04N 21/23109* (2013.01); *H04N 21/23113* (2013.01); *H04N 21/2743* (2013.01); *H04N 21/4332* (2013.01); *H04N 21/4335* (2013.01)

(56) References Cited

U.S. PATENT DOCUMENTS

| | | | |
|---|---|---|---|
| 7,774,385 | B1 | 8/2010 | Kaminski, Jr. |
| 8,280,861 | B1 * | 10/2012 | Park et al. ............ 707/692 |
| 2002/0059317 | A1 | 5/2002 | Black et al. |
| 2003/0004966 | A1 * | 1/2003 | Bolle et al. ............ 707/104.1 |
| 2003/0086341 | A1 * | 5/2003 | Wells et al. ............ 369/13.56 |
| 2003/0154493 | A1 | 8/2003 | Kagle et al. |
| 2007/0180265 | A1 | 8/2007 | Hiroshi |
| 2007/0239756 | A1 | 10/2007 | Li et al. |
| 2008/0034268 | A1 * | 2/2008 | Dodd et al. ............ 714/755 |
| 2009/0263014 | A1 * | 10/2009 | Zhang et al. ............ 382/165 |
| 2011/0113037 | A1 | 5/2011 | Wessling et al. |
| 2011/0116719 | A1 * | 5/2011 | Bilobrov ............ 382/217 |
| 2011/0173185 | A1 | 7/2011 | Vogel |
| 2011/0188704 | A1 * | 8/2011 | Radhakrishnan et al. .... 382/100 |
| 2011/0208744 | A1 | 8/2011 | Chandiramani et al. |
| 2012/0004958 | A1 * | 1/2012 | Bloom et al. ............ 707/758 |
| 2012/0030212 | A1 | 2/2012 | Koopmans et al. |
| 2012/0150827 | A1 | 6/2012 | Ishii et al. |
| 2013/0332951 | A1 * | 12/2013 | Gharaat et al. ............ 725/19 |

OTHER PUBLICATIONS

International Search Report and Written Opinion of the International Searching Authority, dated Jun. 21, 2013, re PCT/FI2013/050305 filed Mar. 18, 2013, 4 pages.

National Board of Patents and Registration of Finland Search Report, dated Sep. 28, 2012, re Finnish Application No. 20125296, 6 pages.

Yujuna Tan et.al, "SAM: A Semantic-Aware Multi-tiered Source De-duplication Framework for Cloud Backup", 2010 39th International Conference on Parallel Processing (ICPP), Sep. 13, 2010, DOI 10.1109/ICPP2010.69 pp. 614-623.

* cited by examiner

Fig. 7

METHOD AND APPARATUS FOR REDUCING DUPLICATES OF MULTIMEDIA DATA ITEMS IN SERVICE SYSTEM

TECHNICAL FIELD

The present application generally relates to a method and an apparatus for reducing duplicates of multimedia data items of a service system.

BACKGROUND ART

A mobile apparatus may create multimedia data using, for example, camera and voice recording means for producing still images and/or streaming voice or video data. The mobile apparatus may also have some connectivity means for connecting the device to a network or to another device for uploading the captured images from the storage media of the camera to another storage media.

Services exist in networks, e.g. the Internet, for managing data, e.g. multimedia data, received from mobile apparatuses. The services are typically accessed via a web browser or using a client application made specifically for the purpose of accessing the service. The services may provide multimedia data for users based on certain criteria for the multimedia data.

Mobile apparatuses are also connectable to devices such as cameras using a wired or wireless data communication means. The wired data communication means may be e.g. a USB (Universal Serial Bus) connection. The wireless data communication means may utilize be e.g. a Bluetooth or a Wireless LAN connection between the apparatus and the camera.

Because the service system provides multimedia data for users, the users need to be able to rely that certain multimedia data provided by the service system is original and genuine. A solution for identifying possible duplicates of multimedia data is needed. Such solution should reduce the duplicates and improve the reliability of the multimedia captured by a certain multimedia device and approved to the service system.

SUMMARY

According to a first example aspect of the invention there is provided a method for reducing duplicates of multimedia data items of a service system, the method comprising:
 maintaining service system hash values for the multimedia data items of the service system;
 receiving a first multimedia data item;
 hashing the received multimedia data item to provide a first hash value;
 searching the first hash value from the service system hash values; and
 approving the received multimedia data item to the service system in response to the first hash value being not found when searching from the service system hash values.

In an embodiment, the method further comprises storing the approved multimedia data item to the service system in response to the approving step.

In an embodiment, the method further comprises storing the first hash value and an identifier for the approved multimedia data item to the service system in response to the approving step.

In an embodiment, the method further comprises storing the first hash value to the service system hash values used in the searching step.

In an embodiment, the method further comprises rejecting the received multimedia data item from the service system in response to the first hash value being found when searching from the service system hash values.

In an embodiment, the method further comprises transmitting a rejection message to a sender of the rejected multimedia data item.

In an embodiment, the multimedia data item comprises multimedia data and metadata.

In an embodiment, the method further comprising:
 maintaining service system hash values for the multimedia data of the service system;
 hashing at least part of the multimedia data of the received multimedia data item to provide a first hash value; and
 approving the received multimedia data item to the service system in response to the first hash value being not found when searching from the service system hash values.

In an embodiment, the method further comprising:
 scaling the multimedia data to fixed size multimedia data; and
 hashing at least part of the fixed size multimedia data to provide a first hash value.

In an embodiment, the method further comprising:
 quantizing pixel data of the multimedia data; and
 hashing at least part of the quantized pixel data to provide a first hash value.

In an embodiment, the method further comprising:
 defining color difference data for pixel data of the multimedia data; and
 hashing at least part of the color difference data to provide a first hash value.

In an embodiment, a MD5 message digest algorithm is used for hashing.

According to a second example aspect of the invention there is provided an apparatus comprising:
 a communication interface for receiving multimedia data items;
 at least one processor; and
 at least one memory including computer program code; the at least one memory and the computer program code configured to, with the at least one processor, cause the apparatus to:
 maintain service system hash values for the multimedia data item of the service system;
 receive a first multimedia data item;
 hash the received multimedia data item to provide a first hash value;
 search the first hash value from the service system hash values; and
 approve the received multimedia data item to the service system in response to the first hash value being not found when searching from the service system hash values.

In an embodiment, the apparatus may comprise a server apparatus.

According to a third example aspect of the invention there is provided a computer program embodied on a computer readable medium comprising computer executable program code which, when executed by at least one processor of an apparatus, causes the apparatus to:
 maintain service system hash values for the multimedia data items of the service system;
 receive a first multimedia data item;
 hash the received multimedia data item to provide a first hash value;
 search the first hash value from the service system hash values; and approve the received multimedia data item to the service system in response to the first hash value being not found when searching from the service system hash values.

Different non-binding example aspects and embodiments of the present invention have been illustrated in the foregoing. The above embodiments are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

The invention will be described, by way of example only, with reference to the accompanying drawings, in which.

DETAILED DESCRIPTION

In the following description, like numbers denote like elements.

Figure 1:
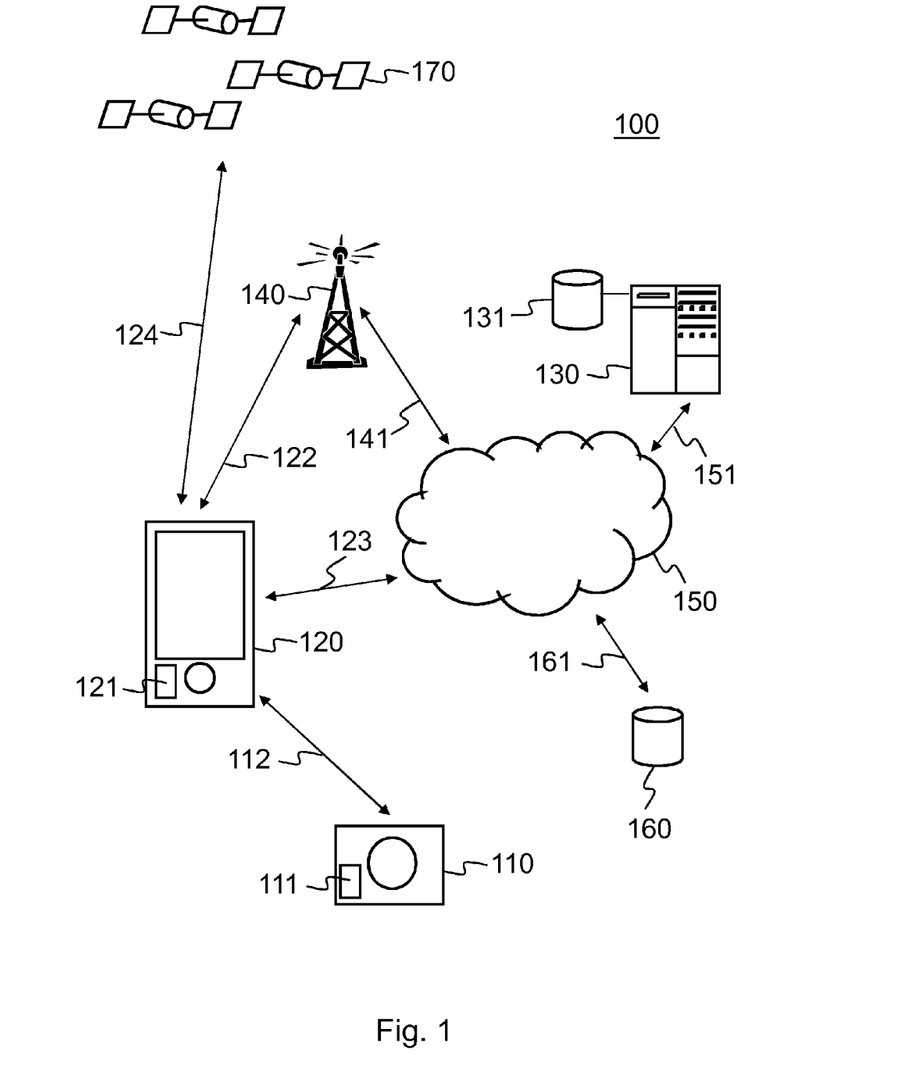
FIG. 1 shows a schematic picture of a system according to an example embodiment of the invention.

FIG. 1 shows a schematic picture of a system 100 according to an example embodiment of the invention. The system 100 comprises a multimedia device 110 configured to be capable of capturing multimedia, such as digital still images and/or video streams. The multimedia device 110 may comprise a storage 111 for a multimedia data item. The storage 111 may comprise a flash memory card, for example. The multimedia device 110 is configured to be connectable to a user apparatus 120 over a data connection 112. The data connection 112 may be a wired connection or a wireless connection. The wired connection may comprise Universal Serial Bus (USB), High-Definition Multimedia Interface (HDMI) or local area network (LAN), for example. The wireless connection may comprise Bluetooth™, Radio Frequency Identification (RF-ID) or wireless local area network (WLAN), for example.

The multimedia device 110 is configured to send the captured multimedia data item over the data connection 112 to the user apparatus 120. Such transmittal may be initiated by a user of the multimedia device 110, by a user of the user apparatus 120, or automatically based on settings. Such settings may comprise for example time of the day, amount of newly captured multimedia data item or existence of the data connection 112 for the multimedia device 110.

The user apparatus 120 may comprise a multimedia device 110, a mobile phone, an internet tablet or a laptop computer, for example. The user apparatus 120 is capable of downloading and locally executing software program code. The software program code may be a client application of a service whose server application is running on the server apparatus 130 of the system 100. The user apparatus 120 may comprise multimedia capturing element, such as a camera, for capturing multimedia, such as still images or video streams, for example. The user apparatus 120 may also have a metadata element 121 for creating data usable as metadata of the multimedia content captured by the multimedia device 110. The metadata element 121 may comprise at least one of the following: a microphone, a positioning device for determining the current location of the user apparatus 120, and a clock. The user apparatus 120 is configured to be connectable to a wireless communication network 140 over a wireless connection 122. The wireless connection 122 may comprise a mobile cellular network or a wireless local area network (WLAN), for example. The wireless communication network may be to a public data communication network 150, for example the Internet, over a data connection 141.

The system 100 may comprise a plurality of satellites 170 in orbit about the Earth. The orbit of each satellite 170 is not necessarily synchronous with the orbits of other satellites and, in fact, is likely asynchronous. A global positioning system receiver apparatus such as the user apparatus 120 in connection with preferred embodiments of the present invention is shown receiving spread spectrum global positioning system (GPS) satellite signals 124 from the various satellites 170.

In an embodiment, the system 100 comprises a server apparatus 130, which comprises a storage device 131 for storing multimedia and metadata received over a data connection 151. The system 100 may further comprise an external database 160, wherein multimedia and metadata may be stored over a data connection 161. The metadata stored in either of the storage device 131 or the external database 160 may comprise reference metadata, such as a multimedia device identifier, multimedia device model information, software version information of the multimedia device, resolution information of the multimedia device or parameters of a camera of the multimedia device, for example.

In an embodiment, a multimedia data item captured by a user may travel to a server apparatus 130 over different paths. A first path may comprise sending the multimedia data item captured by a proprietary application of a user apparatus 120 over a wireless communication network 122, 140, 141 and public data communication network 150, 151 to the server apparatus 130. A second path may comprise sending the multimedia data item captured by a default application of a user apparatus 120 over a wireless communication network 122, 140, 141 and public data communication network 150, 151 to the server apparatus 130. A third path may comprise sending the multimedia data item captured by a multimedia device 110 to the user apparatus 120 and therefrom over a wireless communication network 122, 140, 141 and public data communication network 150, 151 to the server apparatus 130. A fourth path may comprise sending the multimedia data item captured by the multimedia device 110 to a computer apparatus and therefrom over the public data communication network 150, 151 to the server apparatus 130.

In an embodiment, the proprietary application in the user apparatus 120 may be a client application of a service whose server application is running on the server apparatus 130 of the system 100. The proprietary application may capture the multimedia data item for the first path. Also metadata for the captured multimedia may be retrieved by the proprietary application from the metadata elements 121 of the user apparatus 120. The default application may be an imaging application of the user apparatus 120. For the second path, the multimedia data item captured by the default application may be imported to the proprietary application before transmitting to the server apparatus 130. The proprietary application may check the multimedia data item and extract and apply metadata for the multimedia data item. For the third path, the multimedia may be captured by the multimedia device 110 and transmitted to the proprietary application of the user apparatus 120 for sending to the server apparatus 130. The proprietary application may check the multimedia data item and extract and apply metadata for the multimedia data item. User may provide additional metadata using the user apparatus 120. For the fourth path, the multimedia may be captured by the multimedia device 110 and transmitted to a communication application of a computer apparatus. The communication application may check the multimedia data item and extract and apply metadata for the multimedia data item. User may provide additional metadata using the computer apparatus. In a further embodiment, the user may access the multimedia data item on the server apparatus and provide additional metadata.

In an embodiment, the system 100 maintains service system hash values in the server apparatus 130, 131 for the multimedia data item submitted by the user apparatus 120. At least part of the received multimedia data item may be hashed at the server apparatus 130 to provide a first hash value. The first hash value may be searched from the stored service system hash values at the server apparatus 130, 131. If a match is found from the stored service system hash values, it may mean that a duplicate of the received multimedia data item already exists in the system 100. In such case, the received multimedia data item may be rejected from the service system until a further evaluation is done. Further evaluation may comprise for example using identifiers of the multimedia data item associating the multimedia data item and the hash values, to point out the multimedia having similar hash values. Such multimedia data item may be further analyzed to ensure the duplicate and contact the users originally transmitting the duplicate multimedia data item to clarify the source and/or owner of the original multimedia data item.

If a match is not found, the received multimedia data item may be approved to the service system 100 in response to the first hash value being not found when searching from the service system hash values.

In an embodiment, when storing records in a file, a hash function may be used to map each record to an index into a table T, and collect in each bucket T[i] a list of the numbers of all records with the same hash value i. A record may comprise the identifier to link the hash value and the actual multimedia data item, for example. Once the table is complete, any two duplicate records will end up in the same bucket. The duplicates can then be found by scanning every bucket T[i] which contains two or more members, fetching those records, and comparing them. With a table of appropriate size, this method is likely to be much faster than any alternative approach (such as sorting the file and comparing all consecutive pairs).

Figure 2:
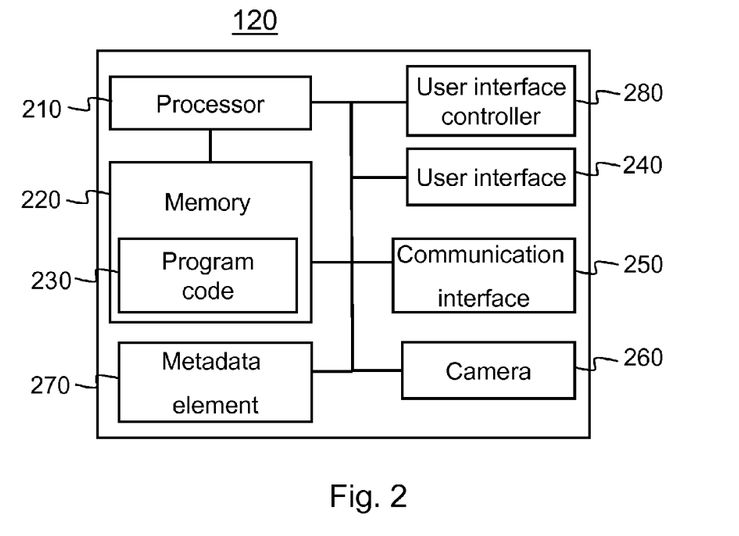
FIG. 2 presents an example block diagram of a user apparatus in which various embodiments of the invention may be applied.

FIG. 2 presents an example block diagram of a user apparatus 120 in which various embodiments of the invention may be applied. The user apparatus 120 may be a multimedia device 110, a user equipment (UE), a user device or an apparatus, such as a mobile terminal, a smart phone or other communication device.

The general structure of the user apparatus 120 comprises a user interface 240, a communication interface 240, a metadata element 270, a camera, a processor 210, and a memory 220 coupled to the processor 210. The user apparatus 120 further comprises software 230 stored in the memory 220 and operable to be loaded into and executed in the processor 210.

The software 230 may comprise one or more software modules and can be in the form of a computer program product. The software 230 may also provide metadata information relating to the software and hardware of the user apparatus 120. The user apparatus 210 may further comprise a user interface controller 280.

The processor 210 may be, e.g., a central processing unit (CPU), a microprocessor, a digital signal processor (DSP), a graphics processing unit, or the like. FIG. 2 shows one processor 210, but the user apparatus 120 may comprise a plurality of processors.

The memory 220 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The user apparatus 120 may comprise a plurality of memories. The memory 220 may be constructed as a part of the user apparatus 120 or it may be inserted into a slot, port, or the like of the user apparatus 120 by a user. The memory 220 may serve the sole purpose of storing data, or it may be constructed as a part of an apparatus serving other purposes, such as processing data. A proprietary multimedia application, a default multimedia application and multimedia data item may be stored to the memory 220.

The user interface controller 280 may comprise circuitry for receiving input from a user of the user apparatus 120, e.g., via a keyboard, graphical user interface shown on the display of the user interfaces 240 of the user apparatus 120, speech recognition circuitry, or an accessory device, such as a headset, and for providing output to the user via, e.g., a graphical user interface or a loudspeaker.

The metadata element 270 comprises element configured to provide metadata information. Such elements may comprise, for example, a positioning device, an accelerometer, a temperature gauge, a clock or a microphone.

The camera 260 may be a still image camera or a video stream camera, capable for creating multimedia data and providing metadata information.

The communication interface module 250 implements at least part of radio transmission. The communication interface module 250 may comprise, e.g., a wireless or a wired interface module. The wireless interface may comprise such as a WLAN, Bluetooth, infrared (IR), radio frequency identification (RF ID), GSM/GPRS, CDMA, WCDMA, or LTE (Long Term Evolution) radio module. The wired interface may comprise such as universal serial bus (USB), for example. The communication interface module 250 may be integrated into the user apparatus 120, or into an adapter, card or the like that may be inserted into a suitable slot or port of the user apparatus 120. The communication interface module 250 may support one radio interface technology or a plurality of technologies. The user apparatus 120 may comprise a plurality of communication interface modules 250. Captured multimedia may be transmitted to a wireless communication network 140 using the communication interface 250.

A skilled person appreciates that in addition to the elements shown in FIG. 2, the user apparatus 120 may comprise other elements, such as microphones, extra displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the user apparatus 120 may comprise a disposable or rechargeable battery (not shown) for powering when external power if external power supply is not available.

In an embodiment, the user apparatus 120 comprises speech recognition means. Using these means, a pre-defined phrase may be recognized from the speech and translated into a metadata tag. This tag may then be used as any other metadata, for example for characterizing the captured multimedia or for grouping images together, for example.

Figure 3:
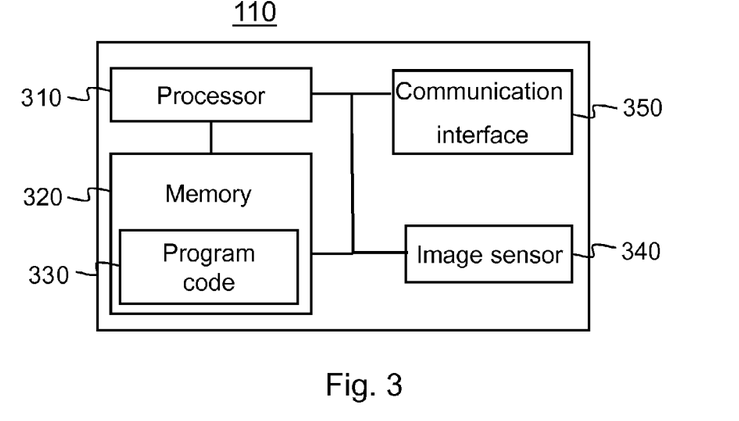
FIG. 3 presents an example block diagram of a multimedia device in which various embodiments of the invention may be applied.

FIG. 3 presents an example block diagram of a multimedia device 110 in which various embodiments of the invention may be applied. The multimedia device 110 may be a digital still camera or digital video camera, for example.

The general structure of the multimedia device 110 comprises a processor 310, and a memory 320 coupled to the processor 310. The multimedia device 110 further comprises software 330 stored in the memory 320 and operable to be loaded into and executed in the processor 310. The software 330 may comprise one or more software modules and can be in the form of a computer program product. The software 330 may provide metadata information of the software or hardware of the multimedia device 110.

The processor 310 may be, e.g., a central processing unit (CPU), a microprocessor, a digital signal processor (DSP), a graphics processing unit, or the like. FIG. 3 shows one processor 310, but the multimedia device 110 may comprise a plurality of processors.

The memory 320 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The multimedia device 110 may comprise a plurality of memories. The memory 320 may be constructed as a part of the multimedia device 110 or it may be inserted into a slot, port, or the like of the multimedia device 110 by a user. The memory 320 may serve the sole purpose of storing data, or it may be constructed as a part of an apparatus serving other purposes, such as processing data.

The image sensor 340 may be a device converting an optical image into an electronic signal, for example a charge-coupled device (CCD) or a complementary metal-oxide-semiconductor (CMOS) active pixel sensor. The image sensor 340 may provide metadata information of the image sensor 340.

The communication interface module 350 implements at least part of radio transmission. The communication interface module 350 may comprise, e.g., a wireless or a wired interface module. The wireless interface may comprise such as a WLAN, Bluetooth, infrared (IR), radio frequency identification (RF ID), GSM/GPRS, CDMA, WCDMA, or LTE (Long Term Evolution) radio module. The wired interface may comprise such as universal serial bus (USB), for example. The communication interface module 350 may be integrated into the multimedia device 110, or into an adapter, card or the like that may be inserted into a suitable slot or port of the multimedia device 110. The communication interface module 350 may support one radio interface technology or a plurality of technologies. The multimedia device 110 may comprise a plurality of communication interface modules 350. Captured multimedia data item of the multimedia device 110 may be transmitted to a user apparatus 120 or to a computer apparatus using the communication interface 350.

Figure 4:
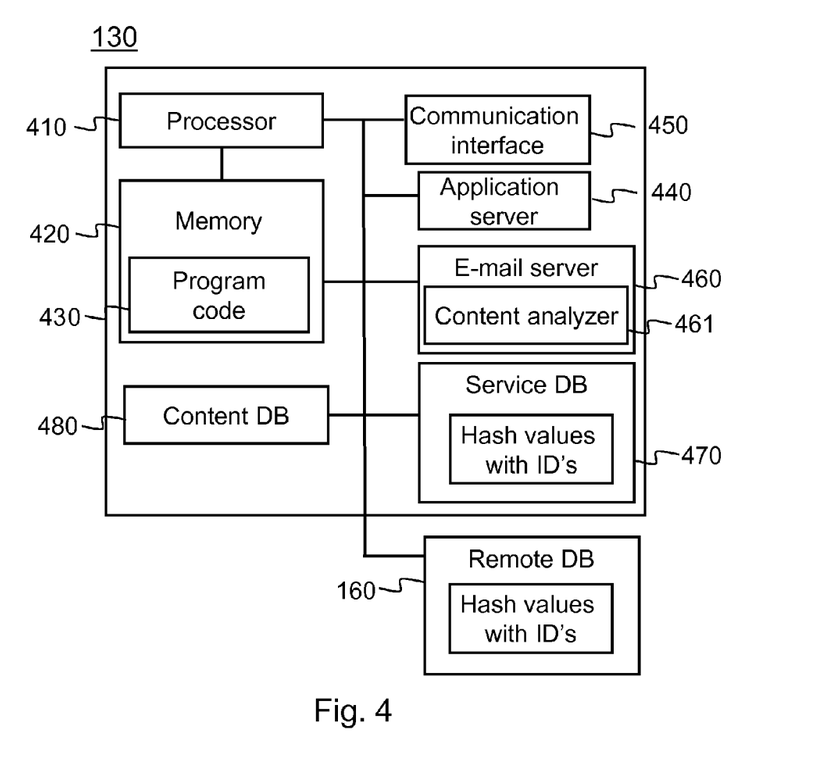
FIG. 4 presents an example block diagram of a server apparatus in which various embodiments of the invention may be applied.

A skilled person appreciates that in addition to the elements shown in FIG. 3, the multimedia device 110 may comprise other elements, such as microphones, displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the multimedia device 110 may comprise a disposable or rechargeable battery (not shown) for powering when external power if external power supply is not available FIG. 4 presents an example block diagram of a server apparatus 130 in which various embodiments of the invention may be applied.

The general structure of the server apparatus 130 comprises a processor 410, and a memory 420 coupled to the processor 410. The server apparatus 130 further comprises software 430 stored in the memory 420 and operable to be loaded into and executed in the processor 410. The software 430 may comprise one or more software modules and can be in the form of a computer program product.

The processor 410 may be, e.g., a central processing unit (CPU), a microprocessor, a digital signal processor (DSP), a graphics processing unit, or the like. FIG. 4 shows one processor 410, but the server apparatus 130 may comprise a plurality of processors.

The memory 420 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The server apparatus 130 may comprise a plurality of memories. The memory 420 may be constructed as a part of the server apparatus 130 or it may be inserted into a slot, port, or the like of the server apparatus 130 by a user. The memory 420 may serve the sole purpose of storing data, or it may be constructed as a part of an apparatus serving other purposes, such as processing data.

The communication interface module 450 implements at least part of radio transmission. The communication interface module 450 may comprise, e.g., a wireless or a wired interface module. The wireless interface may comprise such as a WLAN, Bluetooth, infrared (IR), radio frequency identification (RF ID), GSM/GPRS, CDMA, WCDMA, or LTE (Long Term Evolution) radio module. The wired interface may comprise such as universal serial bus (USB), for example. The communication interface module 450 may be integrated into the server apparatus 130, or into an adapter, card or the like that may be inserted into a suitable slot or port of the server apparatus 130. The communication interface module 450 may support one radio interface technology or a plurality of technologies. The server apparatus 130 may comprise a plurality of communication interface modules 450. Captured multimedia data item of the multimedia device 110 or the user apparatus 120 may be received by the server apparatus 130 using the communication interface 450.

The e-mail server process 460, which receives e-mail messages sent from user apparatuses 120 and computer apparatuses via the network 150. The server 460 may comprise a content analyzer module 461, which checks if the content of the received message meets the criteria that are set for new content data of the service. The content analyzer module 461 may for example check, whether the e-mail message contains a valid still image or a video stream. Such content analysis may comprise for example hashing and searching the hash value from stored system hash values to identify possible duplicates. Processing relating to hashing and searching the hash values may be utilized by at least one of the content analyzer 461, the processor 410 and the memory 420 with the program code 430. The valid content data received by the e-mail server is then sent to an application server 440, which provides application services. The stored system hash values and associated identifiers (ID's) may be stored in the service database 470. The stored system hash values and associated identifiers (ID's) may also be stored in the external database 160, wherein multimedia, hash values and identifiers may be stored over a data connection 161. The stored system hash values and associated identifiers (ID's) may further be stored in the memory 420 or the content database 480. The server storage device 131 of FIG. 1 may correspond to at least one of the content database 480 and the service database 470. Alternatively the server storage device 131 of FIG. 1 may correspond to an external database connected to the server apparatus 130.

In an embodiment, an associated identifier (ID) may comprise a human readable identifier associated to the multimedia data and stored to the system database. The identifier (ID) may be of format "1212-3434" that is easier to utilize by the user (for example in a purchase receipt) than the hashed value of format "c8c050313aea168f53cb11d54192cab1f66034ff". The identifier (ID) may be embedded to the multimedia data (e.g. image data) as a visible text or watermark, for example.

A skilled person appreciates that in addition to the elements shown in FIG. 4, the server apparatus 130 may comprise other elements, such as microphones, displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like.

Figure 5:
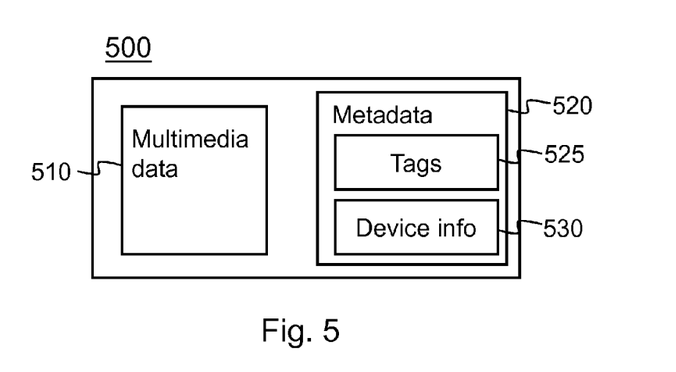
FIG. 5 shows an overall block diagram of an example multimedia data item.

FIG. 5 shows an overall block diagram of an example multimedia data item 500 according to an example embodiment of the invention.

The multimedia data item 500 comprises multimedia data 510, such as image data. Furthermore, the multimedia data item 500 comprises metadata 520. In an embodiment, the metadata 520 comprises multimedia device information 530 as a searchable metadata element for validation of the multimedia data item 500. The metadata 520 may further comprise metadata tags 525 for providing geographical hotspot location for the multimedia data item 500, for example.

The metadata 520 may be written into the multimedia data item 500 for identifying who owns the multimedia data, such as image data 510, copyright & contact information, what camera created the file, along with exposure information and descriptive information such as keywords about the photo, making the file searchable on the computer and/or the Internet. Some metadata 520 may be written by the camera and further metadata 520 may be input by the photographer, user and/or computer software after downloading the multimedia data 510 to a computer, for example.

The metadata 520 may be configured to use a certain standard format, such as Exchangeable Image Format (EXIF). Specifically, FIG. 5 illustrates a single digital image 500 stored in the EXIF format, such as in a file on a computer or on a removable media device in a digital camera. As will be appreciated by those skilled in the art, an EXIF file 500 may contain multiple digital images having a similar format. The metadata 520 may also comprise at least two metadata, for example simple metadata and complex metadata. In FIG. 5 only a single metadata 520 is showed, for simplicity. The metadata 520 may include tags 525. The tags 525 include information such as descriptions, copyright information, date and time information, camera settings such as camera model and make, and information that varies with each image such as orientation (rotation), aperture, shutter speed, focal length, metering mode, location information, and ISO speed information. The tags may further comprise a thumbnail for previewing the picture on the camera's LCD screen, in file managers, or in photo manipulation software.

The metadata 520 format may comprise standard tags 525 for location information. Cameras and mobile devices may have a built-in GPS receiver or a cellular positioning device that stores the location information in the metadata tags 525 when the picture is taken. Some other cameras have a separate GPS receiver that fits into the flash connector, for example. Recorded GPS data can also be added to any digital photograph on a computer, either by correlating the time stamps of the photographs with a GPS record from a hand-held GPS receiver or manually using a map or mapping software. The process of adding geographic information to a photograph is known as geocoding. A system server may allow their users to upload geocoded pictures or to add geolocation information online.

In an embodiment, geographic location data is comprised in the tags 525. Furthermore, the device info 530 may be comprised in the tags 525.

In an embodiment, the metadata 520 may be configured to use any other standard format, such as:

IPTC Information Interchange Model IIM (International Press Telecommunications Council),
IPTC Core Schema for XMP,
XMP—Extensible Metadata Platform (an Adobe standard),
Dublin Core (Dublin Core Metadata Initiative—DCMI), or
PLUS (Picture Licensing Universal System).

In an embodiment, the server apparatus 130 may use at least part of the metadata 520 for hashing, instead of the multimedia data 510. For example, geographic location data comprised in the tags 525 may be used for hashing. The hashed geographical location data may then be used for searching from the stored system hash values to identify duplicates.

In an embodiment, a two-phase hashing may be implemented. In first phase, hash values of the multimedia data 510 may be generated and searched. In case a match is found from the stored system multimedia data hash values, a second phase is triggered. In the second phase hash values of metadata 520 may be generated and searched. In case a match is found from the stored system metadata hash values, a duplicate is confirmed and the multimedia data is rejected from the service system 100. Such approach requires that the system 100 maintains system hash values for both multimedia data and the metadata for each received multimedia data item 500, associated with an identifier.

Figure 6:
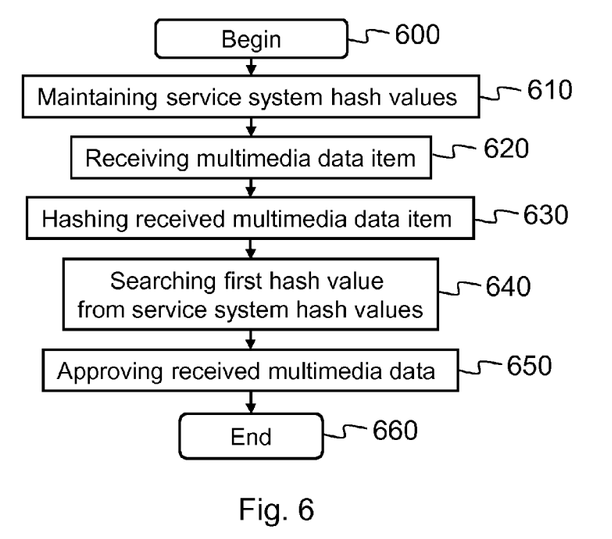
FIG. 6 shows a flow diagram showing operations in accordance with an example embodiment of the invention.

FIG. 6 shows a flow diagram showing operations in accordance with an example embodiment of the invention. In step 600, the method is started. In step 610, service system hash values for multimedia data items of a service system are maintained. In step 620, first multimedia data item is received. At least part of the received multimedia data is hashed to provide a first hash value in step 630. In step 640, the first hash value is searched from the service system hash values. The received multimedia data item is approved, in step 650, to the service system in response to the first hash value being not found when searching from the service system hash values. The method ends in step 650.

Figure 7:
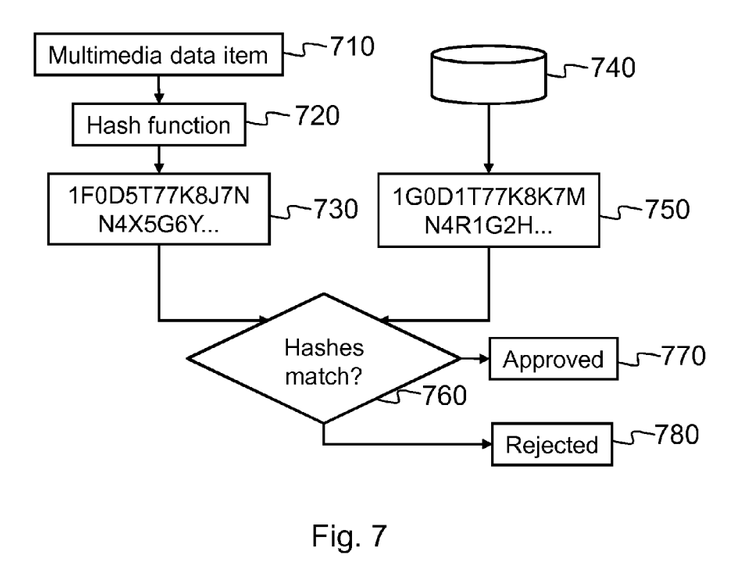
FIG. 7 shows a schematic picture of hashing and approving/rejecting multimedia data items to the service system according to an example embodiment of the invention.

FIG. 7 shows a schematic picture of hashing and approving/rejecting multimedia data to the service system according to an example embodiment of the invention.

In an embodiment, a service user may transmit a multimedia data item to a server. The multimedia data item may comprise multimedia data and associated metadata, for example. Such multimedia data item may be processed at the server apparatus and ensure the system does not contain a duplicate of the multimedia data before approving the received multimedia data of the multimedia data item. The multimedia data may be streaming video or still image, for example.

At least part of the received multimedia data item 710 is used for evaluation of the possible duplication. The multimedia data or the metadata may be used, for example. A part of the multimedia data, such as a block of a still image may be used. A part of the metadata, such as device identifier or geographical location may be used. A hash function 720 is used to hash the multimedia data or a part of the multimedia data item (multimedia data/metadata). The hashed outcome value 730, a digest, may be used for evaluating if possible duplicates may be found in the system.

In an embodiment, already approved multimedia data are stored to the system. Furthermore, service system hash values are maintained in the system storage 740. At least parts of the multimedia data item (multimedia data or metadata) are hashed by the system and saved in storage. The system storage 740 thus contains all hash values of approved multimedia data in hashed format 750. The hash values 750 may be associated with an identifier linking the hash value to the actual multimedia data in the system.

The hash value 730 may be searched from the system hash values 750 stored in the system server 740. In response to the search, a match result 760 may be determined. If the search results as negative, meaning that there is no corresponding hash value found to the hash value 730 from the system hash values 750 stored to the system storage 740, the system may approve 770 the multimedia data of the multimedia data item 710 to the server. If the search results as positive, meaning that there is a corresponding hash value found to the hash value 730 from the system hash values 750 stored to the system storage 740, the system may reject 780 the multimedia data of the multimedia data item 710 from the server. In such case the multimedia data is already received and maintained by the system server.

The hash function 720 may take care of the transformation. Different hash functions may be used, for example MD-4, MD-5 and SHA-1.

MD-4 is a hashing algorithm that results in 128-bit message digest. Even on changing one character or bit in input, the hash value is changed. MD-5 is an extension of MD-4.

SHA results in a 160-bit message. It is different from MD-4 in the sense that it has an additional expansion operation, a further round. This transformation was basically done to accommodate DSS block size effectively. There are various versions—SHA1, SHA-2, for example.

In an embodiment, multimedia data of the multimedia data item is scaled to a fixed size. The fixed size (m×n pixels) may be smaller than the original size of the multimedia data. Only visible pixels of the scaled multimedia data may be hashed. A hash function 720 is used to hash the scaled multimedia data. The hashed outcome value 730, a digest, may be used for evaluating if possible duplicates may be found in the system. The system storage 740 may contain all hash values of correspondingly scaled and approved multimedia data in hashed format 750. The hash values 750 may be associated with an identifier linking the hash value to the actual multimedia data in the system.

In an embodiment, pixel data of the multimedia data is quantized to reduce hues in the multimedia data. After the quantization, the pixel data of the multimedia data is hashed using the hash function 720. The system storage 740 may contain all hash values of correspondingly quantized and approved multimedia data in hashed format 750. The hash values 750 may be associated with an identifier linking the hash value to the actual multimedia data in the system. Such quantization and hue reduction improves identification of possible duplicates because altering a single hue value of the multimedia data may not affect the hashed outcome value 730.

In an embodiment, pixel color data of the multimedia data is hashed using the hash function 720. The system storage 740 may contain all hash values of correspondingly hashed and approved multimedia data in hashed format 750.

In an embodiment, pixel color difference data of the multimedia data is hashed using the hash function 720. The system storage 740 may contain all hash values of correspondingly hashed and approved multimedia data in hashed format 750. Such usage of pixel color difference data improves identification of possible duplicates because altering a hue or tone value of the multimedia data may not affect the hashed outcome value 730.

Various embodiments have been presented. It should be appreciated that in this document, words comprise, include and contain are each used as open-ended expressions with no intended exclusivity. If desired, the different functions discussed herein may be performed in a different order and/or concurrently with each other. Furthermore, if desired, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means or in different combinations of embodiments without deviating from the characteristics of the invention.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. A method for reducing duplicates of multimedia data item of a service system, the method comprising:

maintaining, at a server apparatus, service system hash values for the multimedia data item of the service system;

receiving, by the server apparatus, a first multimedia data item, wherein the first multimedia data item comprising still image data and metadata;

hashing a block of the still image data to provide a first hash value;

searching the first hash value from the service system hash values;

approving the received multimedia data item to the service system in response to the first hash value being not found when searching from the service system hash values;

triggering hashing of at least part of the metadata in response to the first hash value being found when searching from the service system hash values;

hashing at least part of the metadata to provide a second hash value;
searching the second hash value from the service system hash values; and
rejecting the received multimedia data item from the service system in response to the first and the second hash value being found when searching from the service system hash values.

2. The method of claim 1, further comprising:
storing the approved multimedia data item to the service system in response to the approving step.

3. The method of claim 1, further comprising:
storing the first hash value and an identifier for the approved multimedia data item to the service system in response to the approving step.

4. The method of claim 1, further comprising:
storing the first hash value to the service system hash values used in the searching step.

5. The method of claim 1, further comprising:
rejecting the received multimedia data item from the service system in response to the first hash value being found when searching from the service system hash values.

6. The method of claim 1, further comprising:
scaling the still image data to fixed size multimedia data; and
hashing at least part of the fixed size multimedia data to provide a first hash value.

7. The method of claim 1, further comprising:
quantizing pixel data of the still image data; and
hashing at least part of the quantized pixel data to provide a first hash value.

8. The method of claim 1, further comprising:
defining color difference data for pixel data of the still image data; and
hashing at least part of the color difference data to provide a first hash value.

9. A server apparatus comprising:
a communication interface for receiving multimedia data item;
at least one processor; and
at least one memory including computer program code;
the at least one memory and the computer program code configured to, with the at least one processor, cause the apparatus to:
  maintain service system hash values for the multimedia data item of the service system;
  receive a first multimedia data item, wherein the first multimedia data item comprising still image data and metadata;
  hash a block of the still image data to provide a first hash value;
  search the first hash value from the service system hash values; and
  approve the received multimedia data item to the service system in response to the first hash value being not found when searching from the service system hash values;
  trigger hashing of at least part of the metadata in response to the first hash value being found when searching from the service system hash values;
  hash at least part of the metadata to provide a second hash value;
  search the second hash value from the service system hash values; and
  reject the received multimedia data item from the service system in response to the first and the second hash value being found when searching from the service system hash values.

10. The server apparatus of claim 9, wherein the at least one memory and the computer program code are further configured to, with the at least one processor, cause the apparatus to:
store the approved multimedia data item to the service system in response to the approving step.

11. The server apparatus of claim 10, wherein the at least one memory and the computer program code are further configured to, with the at least one processor, cause the apparatus to:
store the first hash value and an identifier for the approved multimedia data item to the service system in response to the approving step.

12. The server apparatus of claim 10, wherein the at least one memory and the computer program code are further configured to, with the at least one processor, cause the apparatus to:
store the first hash value to the service system hash values used in the searching step.

13. The server apparatus of claim 9, wherein the at least one memory and the computer program code are further configured to, with the at least one processor, cause the apparatus to:
reject the received multimedia data item from the service system in response to the first hash value being found when searching from the service system hash values.

14. The server apparatus of claim 9, wherein the at least one memory and the computer program code are further configured to, with the at least one processor, cause the apparatus to:
scale the still image data to fixed size multimedia data; and
hash at least part of the fixed size multimedia data to provide a first hash value.

15. The server apparatus of claim 9, wherein the at least one memory and the computer program code are further configured to, with the at least one processor, cause the apparatus to:
quantize pixel data of the still image data; and
hash at least part of the quantized pixel data to provide a first hash value.

16. The server apparatus of claim 9, wherein the at least one memory and the computer program code are further configured to, with the at least one processor, cause the apparatus to:
define color difference data for pixel data of the still image data; and
hash at least part of the color difference data to provide a first hash value.

17. A computer program embodied on a computer readable non-transitory medium comprising computer executable program code which, when executed by at least one processor of a server apparatus, causes the server apparatus to:
maintain service system hash values for the multimedia data item of the service system;
receive a first multimedia data item, wherein the first multimedia data item comprising still image data and metadata;
hash a block of the still image data to provide a first hash value;
search the first hash value from the service system hash values;
approve the received multimedia data item to the service system in response to the first hash value being not found when searching from the service system hash values;
trigger hashing of at least part of the metadata in response to the first hash value being found when searching from the service system hash values;

hash at least part of the metadata to provide a second hash value;
search the second hash value from the service system hash values; and
reject the received multimedia data item from the service system in response to the first and the second hash value being found when searching from the service system hash values.

18. The computer program embodied on a computer readable non-transitory medium comprising computer executable program code of claim 17 which, when executed by at least one processor of a server apparatus, causes the server apparatus to:
store the approved multimedia data item to the service system in response to the approving step; and
store the first hash value and an identifier for the approved multimedia data item to the service system in response to the approving step.

19. The computer program embodied on a computer readable non-transitory medium comprising computer executable program code of claim 17, wherein the at least one memory and the computer program code are further configured to, with the at least one processor, cause the server apparatus to:
store the approved multimedia data item to the service system in response to the approving step; and
store the first hash value to the service system hash values used in the searching step.

20. The computer program embodied on a computer readable non-transitory medium comprising computer executable program code of claim 17, wherein the at least one memory and the computer program code are further configured to, with the at least one processor, cause the server apparatus to:
reject the received multimedia data item from the service system in response to the first hash value being found when searching from the service system hash values.

* * * * *